United States Patent
Andrews, Jr.

[11] 3,805,411
[45] Apr. 23, 1974

[54] COMBINATION GOLF SCORE CARD AND TRUE DISTANCE INDICATOR-CALCULATOR

[75] Inventor: Charles L. Andrews, Jr., Houston, Tex.

[73] Assignee: True Distance, Inc., Houston, Tex.

[22] Filed: Mar. 20, 1972

[21] Appl. No.: 236,396

[52] U.S. Cl.................... 35/7 R, 35/40, 273/176
[51] Int. Cl. ............................................. G09b 25/08
[58] Field of Search ................ 35/7, 40; 273/176 L

[56] References Cited
UNITED STATES PATENTS

| | | | |
|---|---|---|---|
| 1,353,889 | 9/1920 | Brown | 283/49 |
| 2,169,536 | 8/1939 | Morris | 283/49 |
| 3,552,290 | 1/1971 | Brechtel | 35/40 X |
| 3,685,168 | 8/1972 | Reitz | 35/40 |

OTHER PUBLICATIONS
'Chart-A-Course Scorecard' Golf World, June 10, 1969 Page 22.

Primary Examiner—Robert W. Michell
Assistant Examiner—J. H. Wolff
Attorney, Agent, or Firm—Roy Hammond Smith, Jr.

[57] ABSTRACT

The invention is a card in the form of an accurate scale map of one or more complete holes of a golf course — tees, fairway, nearby rough and green, and including two kinds of intelligence. One of these is all of the principal landscape features of the hole such as trees, bushes, bodies of water, and artificial hazards such as sand traps. The other type of intelligence is a set of markings or indicia superimposed at convenient intervals on recognizable parts of such landscape features, together with written intelligence identifying the true distance between each indicium and the golf player's goal — the cup or center of the green. The preferred form of indicia are circular arcs drawn with the cup or center of green as a center, so that the indicia may be extended from a selected landscape feature all the way across the fairway, with the distance of that arc from the cup written in yards. These arcs are spaced along the length of the fairway at convenient intervals which depend on the frequency of identifiable features, preferably spaced from one another in the range of 25 to 100 yards.

While a separate map may be used for each hole, or one overall map can be prepared for all the holes in their proper geographic relationships to one another, the preferred card or plan is a composite in which separate maps of the holes are re-arranged on a card to avoid irregular shapes and reduce the size of the card to one convenient for the player. Also for the golfer's convenience, it is preferred to combine the scale plan or map with the same card he uses to keep an account of his score.

1 Claim, 1 Drawing Figure

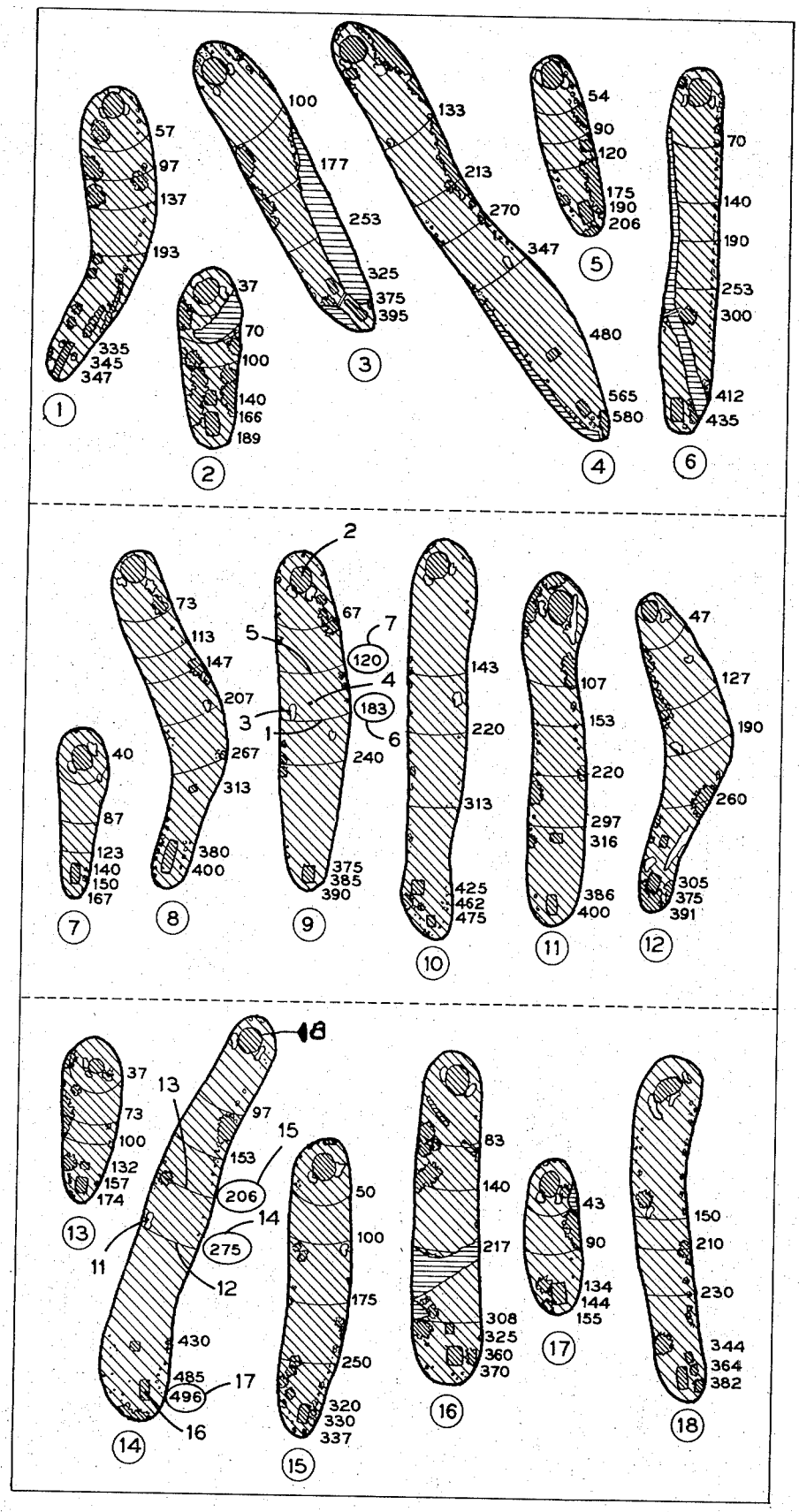

COMBINATION GOLF SCORE CARD AND TRUE DISTANCE INDICATOR-CALCULATOR

The present invention concerns the game of golf, and is particularly directed toward furnishing the golf player with written information that he can compare with the location of his ball to determine where he is and how far he has to go, especially when his ball lies somewhere between the tee of a hole under play and the green of the same hole. More specifically, the present invention lies in a card containing an accurate scale map of one or more of the holes of a golf course, such map containing indicia and intelligence enabling the player to estimate accurately the true distance of his ball from the cup of the hole which constitutes his immediate objective. While such a map may be printed on a separate card, it is most conveniently added to one of the same cards on which the golfer keeps score of his strokes; e.g., the map may be printed on one side of the card and the score card data and blank spaces may be printed on the other for correlation as the game progresses.

One of the problems confronting every golfer is the selection of the club to use on the stroke immediately facing him, whether this be on the tee shot or any intermediate shot before his efforts cause the ball to arrive at the green. This problem is most intense for the golfer playing a course strange to himself, for the occasional golfer, and for those persons who for any of a various number of reasons have difficulty in estimating distances. The typical score card is of little help, as it commonly furnishes no helpful information other than the total distance between tee and cup. Such typical card is nothing more than a number of preprinted columns and lines, one column listing all eighteen holes in serial order, another the total yardage for each, while the rest of the columns are blank so that the various players can cause their strokes to be entered by whoever keeps score. After the tee shot, with his ball lying somewhere on the fairway or the adjoining rough, the golfer is at the mercy of his own ability to estimate distances, or must take secondhand information from one of his fellow players or a caddy. A golfer of independent nature may be very reluctant to ask others for such information, as he instinctively tries to stay clear of putting himself in someone else's obligation. What he needs is some form of intelligence that he can carry with him, intelligence which he can utilize for the particular location of his golf ball and will tell him with a relatively small margin of error the true distance from his ball to the cup as he progresses from hole to hole.

Of course, the golfer could make use of cumbersome equipment such as an accurate aerial survey map of the golf course, together with means for scaling the map distance from the green to some nearby feature of the landscape, if recognized, but such equipment would be cumbersome to carry, would require calculations to translate the map distance to the true ground distance, and would be so time consuming as to put all parties involved in the play out of patience. An equally unsuitable alternative would be his carrying and employing ground-measuring devices such as long tape measures. Such alternative would also be misleading, because the true distance for the golfer is the "as the crow flies" distance, which is also the distance traveled by his ball. This is likely to be appreciably shorter than a measured ground distance, which includes all undulations of the terrain.

Accordingly, the principal object of the invention is to furnish the golfer with written intelligence from which he can, with fair accuracy, estimate the true distance frŏm the location of his ball on any given hole of the golf course, to the cup of such hole.

The object of the invention may also be stated as one of providing a pocket size plan or map of the hole of a golf course then under play, together with means superimposed thereon which enable the player to estimate both the location or lie of his ball on the map and the true distance between his ball and the cup.

STATEMENT OF INVENTION

According to the present invention, the golfer is provided with a card he can usually carry in his pocket. This card contains an accurately scaled map of at least the hole he is about to play, and preferably all of them included in the course (or that part of the course he is going to play). At one end the map will begin with the tee and the immediately adjacent area, while at the other end there is the green and adjacent area. Between its ends the map preferably includes all of the fairway and adjacent roughs, together with all principal landscape features such as trees, clumps of bushes, water hazards and the like, including sand traps and other artificially created hazards. Since the only practical type map will be two-dimensional, any convenient color scheme can be utilized to indicate the nature of such features. As one example, a light green may be used for the low grass of the fairways, a darker green for the close-cropped tees and greens, while a very dark green or green-black may be used for trees and bushes. All water areas such as lakes, ponds, and streams can be indicated by the traditional blue, while such artificial hazards as sand traps may be indicated in white. While no particular color scheme is essential, those just set forth are so commonly known that no explanation is necessary to the player using a card so colored.

The invention then superimposes on such map a number of indicia located at readily recognizable landscape features, e.g., an end of a water hazard or sand trap, a recognizable tree or clump of bushes, and the like. These indicia are preferably spaced along the fairway at intervals of from 25 to 100 yards, so that a golfer whose ball lies between a pair of such indicia may estimate his distance from either of them very readily, and may then go on to estimate his total distance from the cup. This he accomplishes with the assistance of numerical entries adjacent each indicium, each such entry preferably indicating the distance of such indicium from the cup, or the center of the green. Thus, if he lies about midway between two indicia labeled "86" and "144," he knows that his approximate true distance from the cup is 86 + ½ (144 − 86) or 86 + ½ of 58 = 86 + 29 = 115 yards.

While indicia in the form of mere dots, e.g., a distinctive black dot at the end of a sand trap, may be utilized effectively with the accompanying numerals, the preferred form of indicia is a circular arc passing through the particular geographic feature utilized, utilizing the cup of the hole as the center of the circular arc. In this manner the indicia can be spread across the entire fairway and adjacent roughs, making possible its use by the golfer whose ball may lie laterally displaced from one landscape feature, by virtue of the fact that the arc may pass through a second recognizable feature, or by his sighting laterally to the prominent feature through which the arc passes and estimating the location of the arc on the ground itself. Once the golfer has a reasonable estimate of his true distance from the cup, he is well prepared for selection of the club to be used on the next stroke, and frequently this is a vital decision. Knowing the average distance he is able to obtain with each of his clubs, the golfer will avoid the error of selecting a club which will not give him the maximum distance when maximum distance is called for, and will similarly avoid overplaying a green or joint of a dogleg, when he should limit the distance he hopes to get from his stroke.

DRAWING FIGURES

The invention may perhaps be more readily understood by reference to the accompanying drawing, in which the single FIGURE has 18 discrete parts numbered from one through 18 to correspond to the holes of a particular course. To prevent confusion between the hole numerals and those numerals used to identify drawing elements in the discussion below, the numerals identifying the holes have all been printed directly below the corresponding hole, and each has been set in a circle of uniform size. In addition, the drawing elements have all been identified by arabic numerals starting with one and ending with less than 20, and these have been printed in a larger type than the yardage figures at the right side of each hole.

It may be noted that the drawing FIGURE depicts a golf course in actual specific use, namely the Lakeside course of the Greenbrier Hotel, located in White Sulphur Springs, West Virginia. The utility of the invention has been demonstrated by an actual reduction to practice with a four color map corresponding to the black and white drawing herein. To bring out the correspondence, it should be noted that the blank areas are white to represent sand traps, the horizontally shaded areas are blue for water hazards, and all of the areas crosshatched with diagonal lines extending upwardly to the left define the other geographic features. The area in which the diagonal crosshatching lines are most widely spaced represent green fairways, the somewhat more closely spaced hatching represents tees and green, while the very dense hatching represents trees and shrubs.

The arabic numerals imprinted around the outline of the hole represent true distances in yards from the cup to the indicia with which the yardage is associated, the indicia themselves being indicated by circular arcs. In the map of hole nine, for instance, it can be seen from element 6 that the arc 1 has a radius of 183 yards from green 2, and arc 1 is also seen to pass through the lowermost extremity of sand trap 3. A golfer whose ball comes to rest in the location marked 4 will compare his map with the sand trap, and will note that it is 183 yards from the lowermost end of the sand trap to the cup. Knowing this he can estimate, with the aid of indicia 5 and its associated yardage element 7 (120 yards), what part of the direct 183-yard distance lies between his location and the cup, e.g., 160 yards, and select his club accordingly.

An incidental benefit to the golfer comes about by using the map indicia and yardages in reverse. Taking hole 14, for instance, the golfer without a yardage handicap will tee off from tee 16 at the location marked 17, indicating 496 yards. Since the fairway is straightaway, he can use the club which will give him his maximum distance, usually the driver. Assuming a straight shot, if he is a powerful golfer his ball will land somewhere behind the indicia marked 12 and shown by element 14 to have a radius of 275 yards, passing through the south end of the first sand trap 11, or even between the indicia 12 and 13, the latter shown by element 15 to have a radius of 206 yards from the center of green 18. From either location he can estimate how short of the nearest advance indicia he has fallen, and arrive at the remaining distance to the cup in the usual manner. Using this yardage distance, he can easily obtain the distance of his drive from the tee by subtracting his yet-to-go yardage from the total hole yardage, in this case 496.

It will be noted that in the above the indicia and associated numbers use the green or its center, or the cup located somewhere in the green, as the reference point. It will be apparent that some other reference point could be used, and that one such seemingly convenient reference point is the tee. Thus a golfer using a tee-oriented card would measure everything in terms of the distance from the tee; knowing the total yardage between tee and green, he could then obtain the distance remaining from the lie of his ball to the green by subtraction. Cards so marked do not represent the preferred embodiment of the invention, however, because there are different tees for different classes of golfers, such as the expert player who tees off at the maximum distance from the green, the handicap player who tees off from a tee location a few yards closer to the green, and the women players who tee off from yet a third tee, closer to the green than either of the tees of the male players. If only one of these three tees were chosen as the center or reference point for the indicia and associated numerals, the player using either of the other two tees would be obligated to remember the difference in calculating his or her remaining distance to the green. On the other hand, superimposing separate sets of both indicia and numbers for each of the three tees, or using one set of indicia each with three numbers per indicium would crowd the map and might be confusing to some players. All of this may be avoided by using the preferred form of the invention, that in which the green itself is the center from which all marker or indicia are measured, and the numbers associated with each indicium are the true distance from the associated landscape feature to the green.

In the above disclosure and in the appended claims the terms "green," "center of the green," and "cup," have been used somewhat interchangably when referring to the locus from which the various markers or indicia are measured, and the associated numbers which identify such distances. While of course it is always the cup which constitutes the golf player's objective, the discrepency between distances to the marker well out on the fairway is insignificantly small between the center of the green and the cup of the green, and it is simplest to choose the reference point for the markers or indicia as the approximate center of the green, particularly since the cup location is shifted from time to time to equalize wear of the turf of the green. Whichever of the three terms is used, it is to be understood that the reference point intended lies within a general area embracing the center of the green and the various different cup locations within that area.

While forming no part of the invention herein, it is preferred that the maps of the invention be made from accurate aerial survey maps, and that the maps of the various holes of a given golf course be made at the same time and from the same elevation. Careful techniques should be used in scaling the negatives to the selected size, and it is preferred that all holes be reproduced on the final product with the same scale. When reproduced in color, it is preferred that the natural colors discussed above be used, namely green for grass, trees and bushes, blue for water and white for sand traps; a contrasting color for the background is preferred, e.g., yellow. It might also be noted that the use of aerial photographs has the advantage of indicating variations in vegatation which may be of considerable assistance to the golfer in fixing the location of his ball on the ground, and that some of these variations are so small and numerous that the mapmaker working only by ground measurements and observations would not include them in his map.

Also included within the scope of the present invention is the combination of the accurate map as above described, together with a separate member containing the indicia, either the map or the separate member being transparent so that one can be laid on top of the other. Preferably the separate member is a transparent sheet, and it need be only large enough to cover the largest hole of a course. At one end of such overlay sheet there will be a dot or small hole to be placed over the green or cup or the center of the green, while various indicia (arcs preferred) will be marked on the sheet, centered on such dot or hole. For even a specific golf course such arcs should be rather closely spaced, the better to be certain that there will be an arc passing through or close by every prominent landscape feature. If the separate indicia sheet is tailored for a particular golf course, and the map of such course depicts all holes on a common scale, each indicium may be marked with true yardage numerals. With a nonuniform scale or for a universal indicia sheet, each indicium may be marked with a multiplier to be used in calculating the true distance on a particular hole, by referring to a scale or legend printed on the map.

What is claimed is:

1. A combined score card and true distance indicator-calculator device for an individual golf course,
   a. the score card portion of said device including a numerical listing of the individual holes of said course with information for each hole setting forth the overall distance from tee to cup, par, handicap and discrete blanks for the entry of individual hole scores of a number of players;
   b. the indicator-calculator portion including accurately drawn reduced scale plans of the individual holes of the course accurately depicting the playing area and both natural and man-made topographical features including tee areas, fairways, greens, trees and bushes, sandtraps and bodies of water, said features being distinguished as to type by printing them in different colors, e.g., one shade of green for fairways, another for tees and greens, white for sand and blue for water, each of said scale plans of the individual holes having superimposed thereon a plurality of arcuate indicia centered on the green and spaced from one another along the fairway between tee and green and a like plurality of numbers displayed adjacent the indicia in one-to-one relationship, each said indicium being disposed adjacent or touching one of said topographical features or a recognizable portion thereof and each associated number being the true distance from its indicium to the green of the hole,
   d. the two portions of the device being related in that each of the scale lengths along the various fairways between tee and cup of the indicator-calculator portion is proportional to both the yardage and par set forth in the score card portion, and also in that the player will consult both portions in planning his hole strategy so that his total number of strokes is par or less, for instance by subtracting from par one putt and one approach stroke and dividing the remaining number of strokes into the total yardage for the hole to obtain a quotient which is the nominal average yardage per stroke necessary to obtain a par score, thereafter adjusting this yardage up or down as deemed necessary by topographical features such as a dog leg or water hazard,
   e. said indicator-calculator portion also enabling the player to determine, for any in-play lie of his golf ball the remaining distance to the green and the distances to any intervening hazards, the distance traveled by his ball on the preceding stroke and what distance he should strive for on his next stroke.

* * * * *